J. W. TRADER, Jr.
WIRELESS CHECK ROW ATTACHMENT FOR CORN PLANTERS.
APPLICATION FILED NOV. 30, 1908.

928,822.

Patented July 20, 1909.
3 SHEETS—SHEET 1.

John W. Trader Jr. Inventor

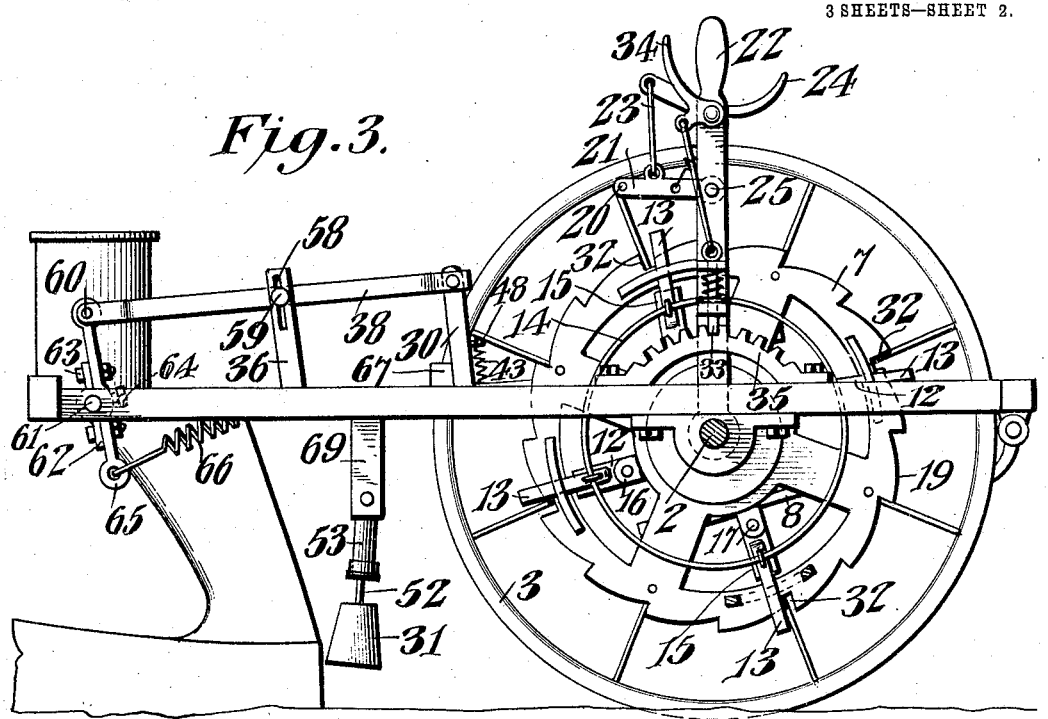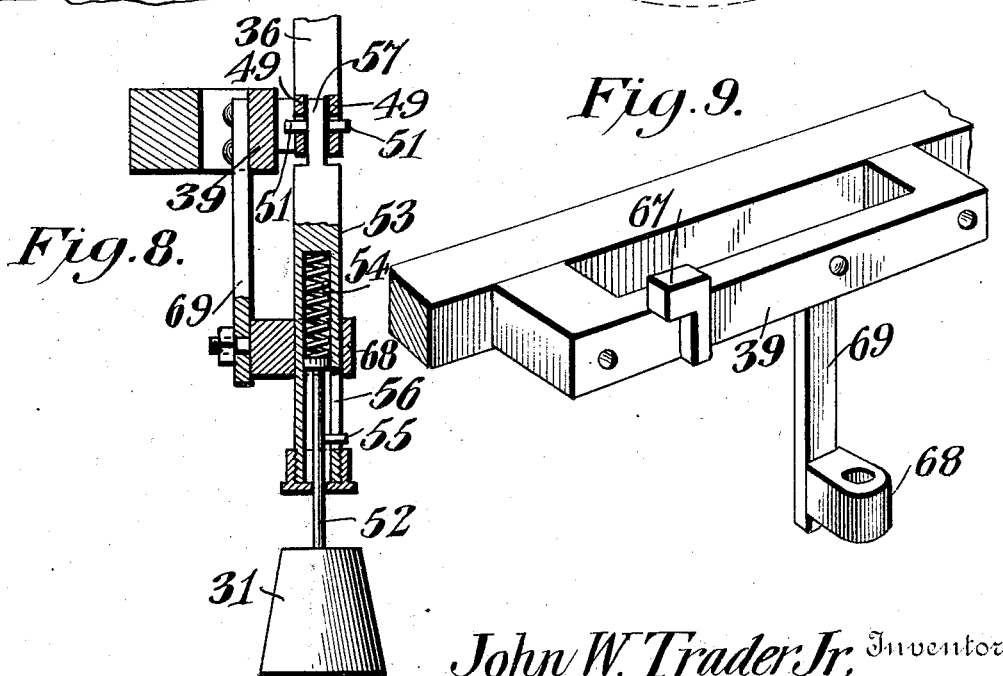

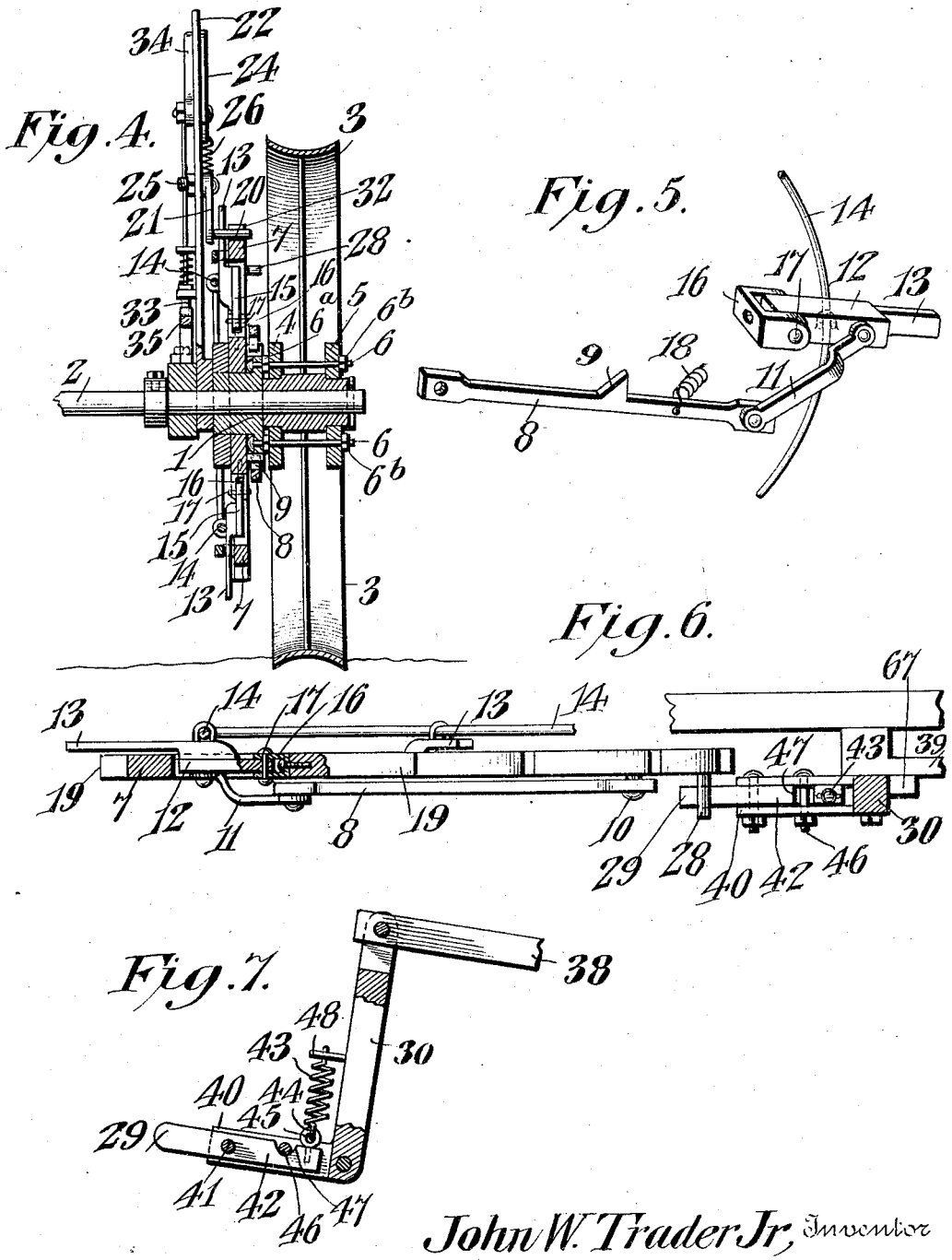

UNITED STATES PATENT OFFICE.

JOHN W. TRADER, JR., OF SEDALIA, MISSOURI.

WIRELESS CHECK-ROW ATTACHMENT FOR CORN-PLANTERS.

No. 928,822.  Specification of Letters Patent.  Patented July 20, 1909.

Application filed November 30, 1908. Serial No. 465,031.

*To all whom it may concern:*

Be it known that I, JOHN W. TRADER, Jr., a citizen of the United States, residing at Sedalia, in the county of Pettis and State of Missouri, have invented a new and useful Wireless Check-Row Attachment for Corn-Planters, of which the following is a specification.

The invention relates to improvements in check row attachments for corn planters.

The object of the present invention is to improve the construction of check row attachments for corn planters, and to provide a simple, inexpensive and efficient check row attachment, adapted to be readily applied to various makes and styles of corn planters, and capable of obviating the many inconveniences resulting from the use of a wire, and susceptible also of adjustment for dropping the corn at intervals the desired distance.

A further object of the invention is to provide an attachment of this character, which will enable corn to be evenly checked on all kinds of ground, and which, should the planter get out of check at any time by reason of its traveling over uneven ground or other bad places, will be capable of being readily repositioned in proper check at any point between the ends of the row.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

Figure 1:
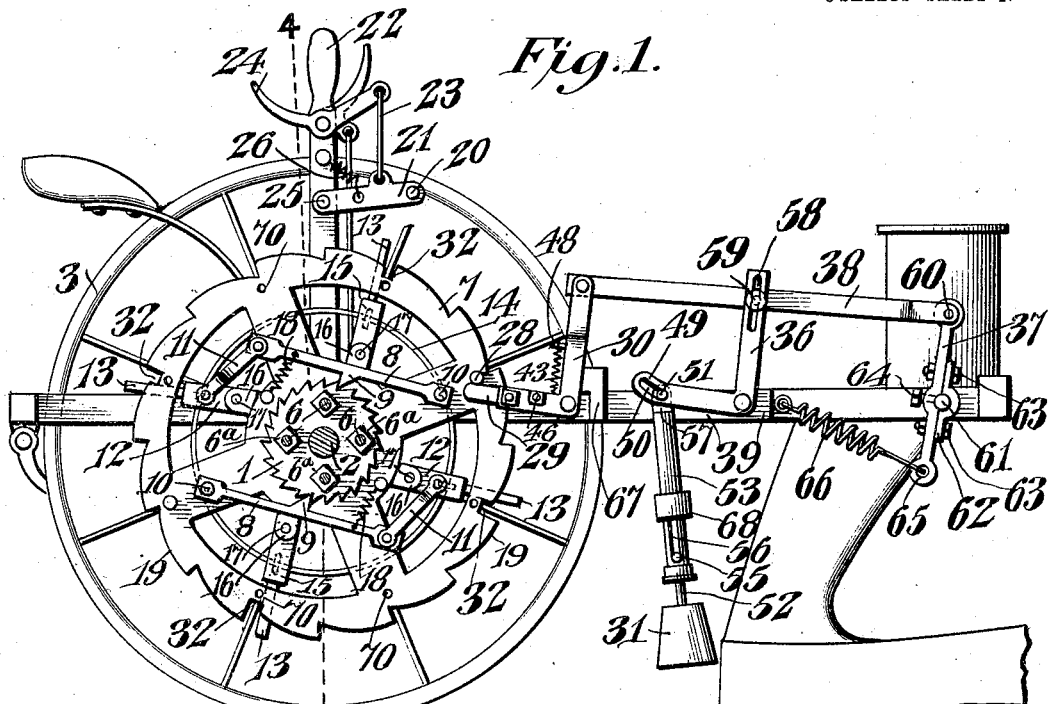
Figure 2:
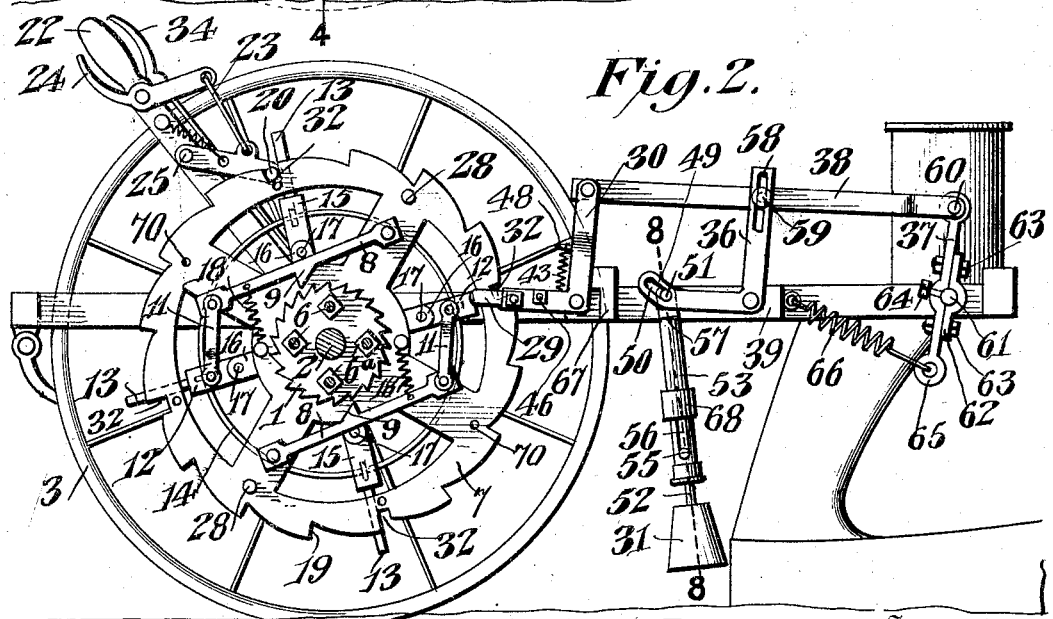

In the drawings:—Figure 1 is a longitudinal sectional view of a portion of a corn planter provided with a check row attachment, constructed in accordance with this invention. Fig. 2 is a similar view, the actuating tappet wheel being disconnected from the driving means to enable it to be arranged properly with relation to the marking and dropping device. Fig. 3 is a longitudinal sectional view, showing the opposite side of the attachment. Fig. 4 is a transverse sectional view on the line 4—4 of Fig. 1. Fig. 5 is a detail view, illustrating the construction for connecting the tappet wheel with the ratchet wheel. Fig. 6 is a detail horizontal sectional view, showing a portion of the tappet wheel and the marker actuating mechanism. Fig. 7 is a detail view of the tappet engaged lever, illustrating the manner of mounting the spring finger. Fig. 8 is an enlarged detail sectional view on the line 8—8 of Fig. 2. Fig. 9 is a detail perspective view of the bracket upon which the tappet engaged lever and the marker operating lever are mounted.

Like numerals of reference designate corresponding parts in all the figures of the drawings.

The attachment comprises in its construction a ratchet wheel 1, designed to be mounted on the shaft or axle 2 of the planter, and adapted, when the shaft or axle rotates, to be keyed or similarly fixed to the same, but when the wheel 3 turns on the axle 2, as illustrated in the accompanying drawings, the ratchet wheel is secured to the said wheel 3 by inner and outer clamping collars 4 and 5 and connecting bolts 6, which extend through the wheel between the spokes thereof. The bolts pierce the ratchet wheel 1, which is clamped between the heads of the bolts and nuts 6ª, while the collars are held against the end portions of the hub by nuts 6ᵇ, arranged on the bolts and engaging the outer faces of the collars. When the machine moves forwardly, rotary motion is communicated to the ratchet wheel through its connection with the wheel 3 of the planter, and the ratchet wheel actuates a tappet wheel 7, loose on the hub of the ratchet wheel 1 and equipped at diametrically opposite points with levers 8, substantially parallel with each other and provided at an intermediate point with pawls 9 for engaging the ratchet wheel. The double engagement of the pawls with the ratchet wheel enables the latter to positively actuate the tappet wheel without permitting the latter to jump forward more rapidly than the ratchet wheel. The pawls 9 are beveled at one side and shouldered at the opposite side, and they are arranged to permit a free backward rotary movement of the ratchet wheel, so that the attachment will not be affected by any retrograde rotation of the wheel 3 in backing or turning the planter. Also the arrangement of the pawls will permit the tappet wheel to be rotated forwardly by the operating mechanism hereinafter described, without disengaging the said pawls from the ratchet wheel.

The levers 8 are pivoted to the tappet wheel 7 by pins 10, or other suitable fastening devices, located at the opposite ends of the levers 8, each lever having one end free and connected by a link 11 with a radially arranged lever 12, mounted between the hub and the periphery of the tappet wheel in the opening or space between the spokes and provided with an outwardly projecting arm or portion 13, extending beyond the periphery of the tappet wheel and adapted to be operated by the means hereinafter described to disengage the pawls from the ratchet wheel to permit an independent backward or forward movement of the tappet wheel for setting the check row attachment. The radially arranged levers 12 and levers 15 hereinafter described are connected by a ring 14, located at one side of the tappet wheel and adapted when one of the radially arranged levers is oscillated to cause the other levers to move in unison for disengaging both of the pawls from the ratchet wheel. The radially arranged levers 12 are located at approximately diametrically opposite points, and the tappet wheel is also provided with the radially arranged levers 15, located at points between the levers 12 and pivotally connected at their inner ends with the hub portions of the tappet wheel and at intermediate points with the ring 14. The hub portion of the tappet wheel is provided with projecting ears 16, located in the space between the spokes and receiving the pivots 17 for mounting the radially arranged levers 12 and 15 on the tappet wheel. The pawls 8 are maintained normally in engagement with the ratchet wheel 1 by means of coiled springs 18, located adjacent to the free ends of the levers 8 and connected with the same and with the hub portion of the tappet wheel. When the lever 8 are moved away from the ratchet wheel to disengage the pawls therefrom, the springs 18 are distended and operate to return the pawls to the ratchet wheel, when the levers are released and free to move.

The tappet wheel 7 is provided at its periphery with teeth 19, beveled or rounded at the front and shouldered at their rear ends and adapted to be engaged by a laterally projecting stud or portion 20 of a pivoted dog 21, mounted on an operating lever 22 and connected by a link 23 with a latch lever 24. The operating lever is pivoted or fulcrumed on the shaft or axle 2, and it extends upward therefrom, being provided at its upper end with a suitable grip or handle for the convenience of the operator. The pawl or dog 21, which is normally extended outward from the operating lever at substantially right angles thereto, is connected at its inner end with the lever by a suitable pivot 25, and the link 23 is connected with the pawl or dog at a point between the ends of the same. The latch lever is pivoted at an intermediate point to the operating lever at the lower end of the grip or handle portion. One arm of the latch lever is connected with the link, and the other arm constitutes a handle and is arranged to be grasped simultaneously with the handle of the operating lever. The dog 21, which is normally held elevated by a coiled spring 26, is adapted to be thrown downward into engagement with the teeth of the ratchet wheel, and the operating lever may be swung forward to partially rotate the tappet wheel, and by being oscillated will rotate the tappet wheel forwardly to carry one of its laterally extending tappets or projections 28 in position for engaging a pivoted spring-controlled finger 29 of an angle lever 30 of mechanism for operating a hill marker 31 and the seed dropping mechanism of the planter. The tappet wheel 7 is also equipped with a plurality of notches 32, located adjacent to the outer portions of the radially arranged levers, and when it is desired to rotate the tappet wheel rearwardly, the dog 21 is engaged behind the outer portion of one of the radially arranged levers 12 and 15, which is swung forwardly independently of the tappet wheel until the dog drops into the notch 32. This operation of the radially arranged lever carries the pawls out of engagement with the ratchet wheel, and the operating lever through the interlocking of the dog and the notch is connected with the tappet wheel, which may then be rotated either backwardly or forwardly by the operating lever. Also this operation of the ratchet mechanism will throw the machine out of operation by lifting the pawls to enable it to be turned or moved from one point or place to another without operating the marker and the seed dropping mechanism. The operating lever is also equipped with a spring actuated dog or detent 33, connected with and controlled by a latch lever 34 and arranged to engage a toothed segment 35, which is mounted on the frame of the planter. The dog or detent and the toothed segment are adapted to lock the operating lever at any adjustment, and will hold the operating lever stationary when it is desired to maintain the pawls or dogs of the ratchet mechanism out of engagement with the ratchet wheel. This will leave both hands of the driver free to control the draft animals when turning or transferring the machine from one field or place to another. The levers 24 and 34 extend from opposite sides of the operating lever and may be operated with one hand while the operator is grasping the operating lever. In setting the tappet wheel the latter is partially rotated by engaging the teeth 21 with the teeth of the ratchet wheel until one of the radial levers is brought within reach of the operating mechanism, and the pawl or dog is then engaged with the radially arranged lever and the adjacent notch 32 should it be necessary to move the tappet wheel rearwardly or throw the machine temporarily out of operation.

The marker operating and seed-dropping actuating mechanism comprises a pair of angle levers 30 and 36 and an arm or member 37, which are connected to a bar 38 so as to move in unison. The angle levers 30 and 36 are fulcrumed at their angles on a bracket or frame 39, which is suitably secured to the frame of the planter. The angle lever 36 is located in front of the angle lever 30, which has one of its arms extending upwardly and its other arm projecting rearwardly. The rearwardly projecting arm is provided with a slot or bifurcation 40 in which the finger 29 is mounted. The finger is pivoted in the slot or bifurcation by a pin 41, piercing the sides of the bifurcated portion of the angle lever and passing through the finger 29 at a point intermediate of the ends thereof. The inner or front portion 42 of the finger is longer and heavier than the outer portion, and the finger is normally maintained in alinement with the rearwardly extending arm of the angle lever by means of a coiled spring 43, detachably connected at its lower end by a hook 44 with an eye 45 of the finger 29, and adapted to hold the finger in engagement with a stop pin 46, extending across the slot or bifurcation of the angle lever and located above the forwardly extending portion 42, which is provided with a notch 47, which receives the stop pin when the finger is in its normal position. The spring 43 extends along the upright arm of the angle lever 30, and it is connected at its upper end to an eye 48 of the said upwardly extending arm. The forward rotary movement of the tappet wheel, carries the tappets or projections into engagement with the finger at the upper edge thereof, and the pressure exerted by the tappets or projections on the outer portion of the finger maintains the latter firm in engagement with the stop pin, and the pins or tappets are adapted to oscillate the angle lever 30, which, through the connecting bar 38, communicates motion to the front angle lever 36 and the arm 37. The spring 43 is adapted to be disconnected from the eye 45 of the finger 29 to permit the front portion of the finger to swing downward and carry the rear portion of the finger upward out of the path of the tappets or projections of the tappet wheel, whereby the machine is thrown out of operation. The spring is also adapted to permit the tappets or projections to prevent the lever 30 from being actuated by a rearward movement of the tappet wheel.

The front angle lever 36 is arranged in a position corresponding with that of the rear angle lever, the upwardly extending arms of the two levers being in parallelism or substantial parallelism. The rearwardly extending arm of the front angle lever 36 is also provided with a bifurcation 49, and the sides thereof have slots 50 for the reception of a pin or pivot 51, which connects the marker 31 with the rearwardly extending arm of the bell crank lever 36, whereby when the angle lever 36 is oscillated, the marker will be moved upwardly and downwardly. The marker, which is designated as a whole by the numeral 31, is provided at the lower end with a head and it has a stem 52, operating in a tubular member 53, which forms a casing or housing for a coiled spring 54, interposed between the upper end of the stem, and the upper wall of the bore or opening of the tubular member is adapted to maintain the marker yieldably in an extended position. The outward movement of the marker is limited by a pin or projection 55 carried by the stem 52 and operating in a longitudinal slot 56 of the tubular member. This construction permits the marker to yield should it come in contact with a clod or stone and injury to the mechanism will thereby be prevented. The upper end 57 of the tubular member is reduced and is secured in the bifurcation 49 by the said pivot 51. The upwardly extending arms of the angle levers 30 and 36 are bifurcated to receive the connecting bar 38, and the sides of the bifurcation of the lever 36 are provided with longitudinal slots 58 in which is arranged the pivot or bolt 59 for connecting the lever 36 with the bar 38.

The front end 60 of the connecting bar is slotted or bifurcated to receive the upper end of the arm 37, arranged in parallelism with the upwardly extending arms of the levers 30 and 36, mounted on the rock shaft 61 of the seed dropping mechanism of the ordinary construction. The upper end of the arm 37 is pivoted in the bifurcation of the front end 60 of the connecting bar 38, and at each operation of the marker operating mechanism, the shaft 61 will be rocked and the seed dropped in the usual manner. As the attachment is designed for various kinds or styles of planters, and as the particular construction of the seed dropping mechanism does not constitute a portion of the present invention, a detail description and illustration of the seed dropping mechanism are deemed unnecessary. The arm 37 is bowed at an intermediate portion and is equipped with a clamping plate 62, also bowed at an intermediate portion and connected with the arm by bolts 63, thereby forming a clamp for engaging the shaft 61. The arm is rigidly secured to the shaft by means of a set screw 64, piercing the arm and engaging the shaft, as clearly shown in Fig. 1 of the drawings.

The lower end of the arm 37 is provided with an eye 65 to which is connected one end of a coiled spring 66, which is secured at its other end to the frame or bracket 39. The tappet wheel swings the levers 30 and 36 and the arm 37 in one direction, and the coiled spring 66 moves the said parts in the opposite direction and returns them to their initial position. The upwardly extending arms of the levers are swung rearwardly by the tappet wheel, and their forward movement is limited by a stop 67, mounted on the frame or bracket 39 and located in advance of and arranged to be engaged by an upwardly extending arm of the rear angle lever 30. When the front angle lever is oscillated it reciprocates the marker, which slides in a guide 68 of an arm 69, depending from the bracket or frame 39.

The tappet wheel is provided at intervals with perforations 70, adapted to receive the projections or tappet pins, which may be varied in number to change the distance between the hills. The machine is adapted to operate close to a fence and the attachment, which obviates all the disadvantages resulting from the use of a wire, is capable of permitting the planter to be arranged in proper check at any point between the ends of a row should the planter by reason of hilly ground or other bad places get out of check. After the operator has planted his first row, he turns the machine around and places the planter so that the hopper will be seven inches in rear of the end mark of the last row. He then sets the tappet wheel so as to bring one of the pins or projections in position for actuating the finger 29 and drives ahead. The machine will then drop the corn the proper distance and in proper check.

Having thus fully described my invention, what I claim as new and desire to secure by Letters Patent, is:—

1. An attachment of the class described including a marker, mechanism for actuating the marker provided with means for also actuating seed dropping mechanism, a ratchet wheel, a tappet wheel arranged at one side of the ratchet wheel and provided with means for actuating the said mechanism, ratchet mechanism carried by the tappet wheel for engaging the ratchet wheel, and manually operable means for rotating the tappet wheel independently of the ratchet wheel for positioning the same with relation to the first mentioned mechanism.

2. An attachment of the class described including a marker, mechanism for actuating the marker provided with means for also actuating seed dropping mechanism, a ratchet wheel, a tappet wheel arranged at one side of the ratchet wheel and provided with means for actuating the said mechanism, ratchet mechanism carried by the tappet wheel for engaging the ratchet wheel, and manually operated mechanism for actuating the tappet wheel, said operating mechanism being provided with means for engaging the ratchet mechanism to release the tappet wheel.

3. An attachment of the class described including a marker, mechanism for actuating the marker provided with means for actuating seed dropping mechanism, a tappet wheel for actuating the said mechanism, a ratchet wheel arranged at one side of the tappet wheel, ratchet mechanism carried by the tappet wheel and engaging the ratchet wheel and including a lever movable to release the ratchet wheel, and an operating lever provided with means for rotating the tappet wheel and for engaging the lever to release the tappet wheel.

4. An attachment of the class described including a marker, mechanism for actuating the marker provided with means for actuating seed dropping mechanism, a tappet wheel provided with means for actuating the said mechanism and having peripheral teeth, a ratchet wheel arranged at one side of the tappet wheel, ratchet mechanism carried by the tappet wheel and engaging the ratchet wheel and including a lever movable to release the ratchet wheel, and an operating lever provided with a dog for engaging the teeth of the ratchet wheel, said dog being also adapted to engage the first mentioned lever to disengage the ratchet mechanism from the ratchet wheel.

5. An attachment of the class described including a marker, mechanism for operating the marker provided with means for actuating seed dropping mechanism, a tappet wheel provided with means for actuating the said mechanism and having peripheral teeth, said ratchet wheel being also provided with a notch, ratchet mechanism carried by the tappet wheel and engaging the ratchet wheel and including a lever movable to disengage the ratchet mechanism from the ratchet wheel and located adjacent to the said notch, and an operating lever having a dog arranged to engage the teeth of the tappet wheel and adapted also to simultaneously engage the first mentioned lever and the notch of the tappet wheel for holding the ratchet mechanism out of engagement with the ratchet wheel to release the tappet wheel.

6. An attachment of the class described comprising a marker, mechanism for operating the marker provided with means for actuating seed dropping mechanism, a rachet wheel, a tappet wheel provided with means for actuating the said mechanism, ratchet mechanism mounted on the tappet wheel and including a plurality of movable members provided with pawls for engaging the ratchet wheel, a lever connected with the members for simultaneously moving the same into and out of engagement with the ratchet wheel, and an operating lever provided with means for actuating the tappet wheel and for engaging the lever of the ratchet mechanism to release the tappet wheel.

7. An attachment of the class described comprising a marker, mechanism for operating the marker provided with means for actuating seed dropping mechanism, a ratchet wheel, a tappet wheel provided with means for actuating the said mechanism, ratchet mechanism including opposite pivoted members provided with pawls for engaging the ratchet wheel, links connected with the members, a lever, means for connecting the lever with the members for moving the same toward and from the ratchet wheel in unison, and an operating lever provided with means for rotating the tappet wheel and for engaging the lever of the ratchet mechanism.

8. An attachment of the class described comprising a marker, mechanism for operating the marker provided with means for actuating seed dropping mechanism, a ratchet wheel, a tappet wheel provided with means for actuating the said mechanism, ratchet mechanism including members provided with pawls for engaging the ratchet wheel, levers, links connecting the levers with the members, a spring for holding the members in engagement with the ratchet wheel, and an operating lever provided with means for rotating the tappet wheel and for engaging the said levers.

9. An attachment of the class described comprising a marker, mechanism for operating the marker provided with means for actuating seed dropping mechanism, a ratchet wheel, a tappet wheel provided with means for actuating the said mechanism, ratchet mechanism including opposite members provided with pawls for engaging the ratchet wheel, radially arranged levers, links connecting the radially arranged levers with the pivoted members, a spring for maintaining the said members in engagement with the ratchet wheel, a ring connecting the levers, and operating mechanism for actuating the tappet wheel and for engaging the said levers.

10. An attachment of the class described comprising a marker, mechanism for operating the marker provided with means for actuating seed dropping mechanism, a ratchet wheel, a tappet wheel provided with means for actuating the said mechanism, ratchet mechanism including opposite members provided with pawls for engaging the ratchet wheel, radially arranged levers, links connecting the radially arranged levers with the pivoted members, a spring for maintaining the said members in engagement with the ratchet wheel, a ring connecting the levers, other radially arranged levers connected with the ring, and an operating lever provided with means for actuating the tappet wheel and for engaging the radially arranged levers to release the tappet wheel from the ratchet wheel.

11. An attachment of the class described including a marker, mechanism for operating the marker provided with means for actuating seed dropping mechanism, a ratchet wheel having clamping means for engaging the hub of a planter wheel, a tappet wheel provided with means for engaging the first mentioned mechanism, ratchet mechanism mounted on the tappet wheel and engaging the ratchet wheel, and manually operable means for rotating the tappet wheel and for operating the ratchet mechanism to release the tappet wheel therefrom.

12. An attachment of the class described including a marker, mechanism for actuating the marker, a ratchet wheel, a clamp for connecting the ratchet wheel with the hub of a planter wheel, said clamp being composed of opposite collars located on the inner and outer ends of the hub, and a plurality of bolts connecting the collars and securing the same to the hub of the wheel and connecting the ratchet wheel with the inner collar, a tappet wheel for actuating the said mechanism, ratchet mechanism mounted on the tappet wheel for engaging the ratchet wheel, and means for rotating the ratchet wheel and for operating the ratchet mechanism.

13. An attachment of the class described including a pair of correspondingly arranged angle levers pivoted one in rear of the other, a marker connected with one of the angle levers, a tappet wheel for actuating the other angle lever, an arm for actuating seed dropping mechanism, and means for connecting the arm and the angle levers together for causing the same to oscillate in unison.

14. An attachment of the class described including a pair of correspondingly arranged angle levers pivoted one in rear of the other, a marker connected with one of the angle levers, a tappet wheel for actuating the other angle lever, an arm for actuating seed dropping mechanism, means for connecting the arm and the angle lever together for causing the same to oscillate in unison, and a spring connected with the arm for moving the same and the angle levers in one direction.

15. An attachment of the class described including a pair of correspondingly arranged angle levers pivoted one in rear of the other, a marker connected with one of the angle levers, a tappet wheel for actuating the other angle lever, an arm for actuating seed dropping mechanism, means for connecting the arm and the angle lever together for causing the same to oscillate in unison, a spring connected with the arm for moving the same and the angle levers in one direction, and a marker arranged to be engaged by one of the parts for limiting the movement of the same by the spring.

16. An attachment of the class described including correspondingly arranged angle levers pivoted one in rear of the other, a marker connected with the front angle lever, a tappet wheel for engaging the rear angle lever, an arm for actuating seed dropping mechanism, means for connecting the levers and the arm together, and a spring connected with one of the parts for moving the same in one direction.

17. An attachment of the class described including a bracket, a plurality of angle levers correspondingly mounted on the bracket and arranged one in rear of the other, a guide carried by the bracket, a marker operating in the guide and connected with one of the angle levers, a tappet wheel for engaging the other angle lever, an arm designed to be connected with seed dropping mechanism for operating the same, means for connecting the arm with the levers, and a spring connected with the arm and with the bracket.

18. An attachment of the class described including a guide, a marker movable upwardly and downwardly through the guide, an angle lever arranged in rear of and connected with the marker, a second angle lever connected with the first mentioned angle lever, said levers being correspondingly pivoted and a tappet wheel provided with means for operating the second angle lever.

19. An attachment of the class described including a marker, a plurality of correspondingly pivoted angle levers arranged one in rear of the other and connected together, one of the angle levers carrying the marker and the other angle lever being provided with a spring-controlled member, and a tappet wheel provided with means for engaging the spring-controlled member.

20. An attachment of the class described including a marker, a plurality of correspondingly pivoted angle levers arranged one in rear of the other and connected together, one of the angle levers carrying the marker and the other angle lever being provided with a pivoted member, a spring detachably connected with the pivoted member, and a tappet wheel arranged to engage the pivoted member.

21. An attachment of the class described including a marker, a lever connected with the marker for raising and lowering the same, a tappet wheel, a lever arranged to be actuated by the tappet wheel, said levers being correspondingly pivoted and located one in rear of the other, and means for connecting the said levers.

In testimony, that I claim the foregoing as my own, I have hereto affixed my signature in the presence of two witnesses.

JOHN W. TRADER, Jr.

Witnesses:
 WM. H. GENTRY,
 T. J. STURGIS.